MOTOR VEHICLE TRANSMISSION CONTROLS

Filed Dec. 11, 1959 3 Sheets-Sheet 1

INVENTOR
THORVALD G. GRANRYD
Paul O. Pippel
ATTORNEY

INVENTOR
THORVALD G. GRANRYD
ATTORNEY

MOTOR VEHICLE TRANSMISSION CONTROLS

Filed Dec. 11, 1959

INVENTOR
THORVALD G. GRANRYD
Paul O. Pippel
ATTORNEY

United States Patent Office 3,059,495
Patented Oct. 23, 1962

3,059,495
MOTOR VEHICLE TRANSMISSION CONTROLS

Thorvald G. Granryd, Libertyville, Ill., assignor to The Frank G. Hough Co., a corporation of Illinois Filed Dec. 11, 1959, Ser. No. 859,017
8 Claims. (Cl. 74—472)

This invention relates generally to motor vehicle transmission control mechanisms, and more specifically to a motor vehicle transmission control arrangement interrelating a hand lever and a throttle pedal in a certain unique construction.

The present invention relates to what are commonly described as throttle controlled transmission kickdown devices and is intended for use in motor vehicles of the tractor type such as used in front-end type tractor loaders. Front-end type tractor loaders operatively carry an earth working or material handling tool extending from the forward end of the tractor. The tool is used in various digging, carrying and dumping operations of different materials such as earth or gravel. The tractor generally comprises a vehicle carrying an engine which is connected to drive the traction means or wheels of the vehicle through a transmission. Generally these transmissions have three speed ratios and are commonly selectively operated to any one of the three different speed ratios by some hydraulic means controlled by a manually operated hydraulic valve. Further generally, the operator's compartment of the tractor carries a throttle pedal operatively connected to the fuel delivering means or carburetor of the engine for varying the speed and power output of the engine. It oftentimes occurs in the process of working various materials with a tractor loader that working can be accomplished in all three speed ratios. However, sometimes it may be desirable in the working of a particular material to shift the transmission from the third or high speed range to the second or middle range, and sometimes it may be desirable to shift from the second or middle range to the low range or crowding range. The term "crowding range" is used as a descriptive phrase implying that the tractor and its tool is being slowly pushed or crowded into a material to fill the bucket. Because of the necessity or desirability for rapid and convenient downshifting from either the third to the second speed range or from the second to the first speed range, it is the object of the present invention to provide such an arrangement associated with the throttle pedal of the tractor so that the downshifting may be accomplished without operation of the regular transmission shifting means of the tractor. Many downshifting arrangements presently known in the motor vehicle art are unsuitable for the front-end type tractor loader because they only provide one stage of down-shifting.

A further object of the present invention is to provide in a tractor having a hydraulically controlled transmission, certain means controlled by the throttle pedal of the tractor which can be operated to cause the transmission speed range to be shifted from the third range to the second range when the transmission is normally operating in the third range and which may be operated to shift the transmission from the second speed range to the first speed range when the transmission is normally operating in the second speed range.

A further object of the present invention is to provide certain linkage means associated with a throttle pedal and with a manually operated transmission range selector lever in a tractor in such a manner that when the range selector lever is in the third speed range, a certain operation of the throttle pedal will cause a shifting of the transmission to the second speed range, and if the transmission range lever is in the second speed range, the same operation of the throttle pedal will cause the transmission to be shifted to the first speed range.

Other objects and features of the present invention will be apparent upon a perusal of the following specification and drawings of which:

Figure 1:
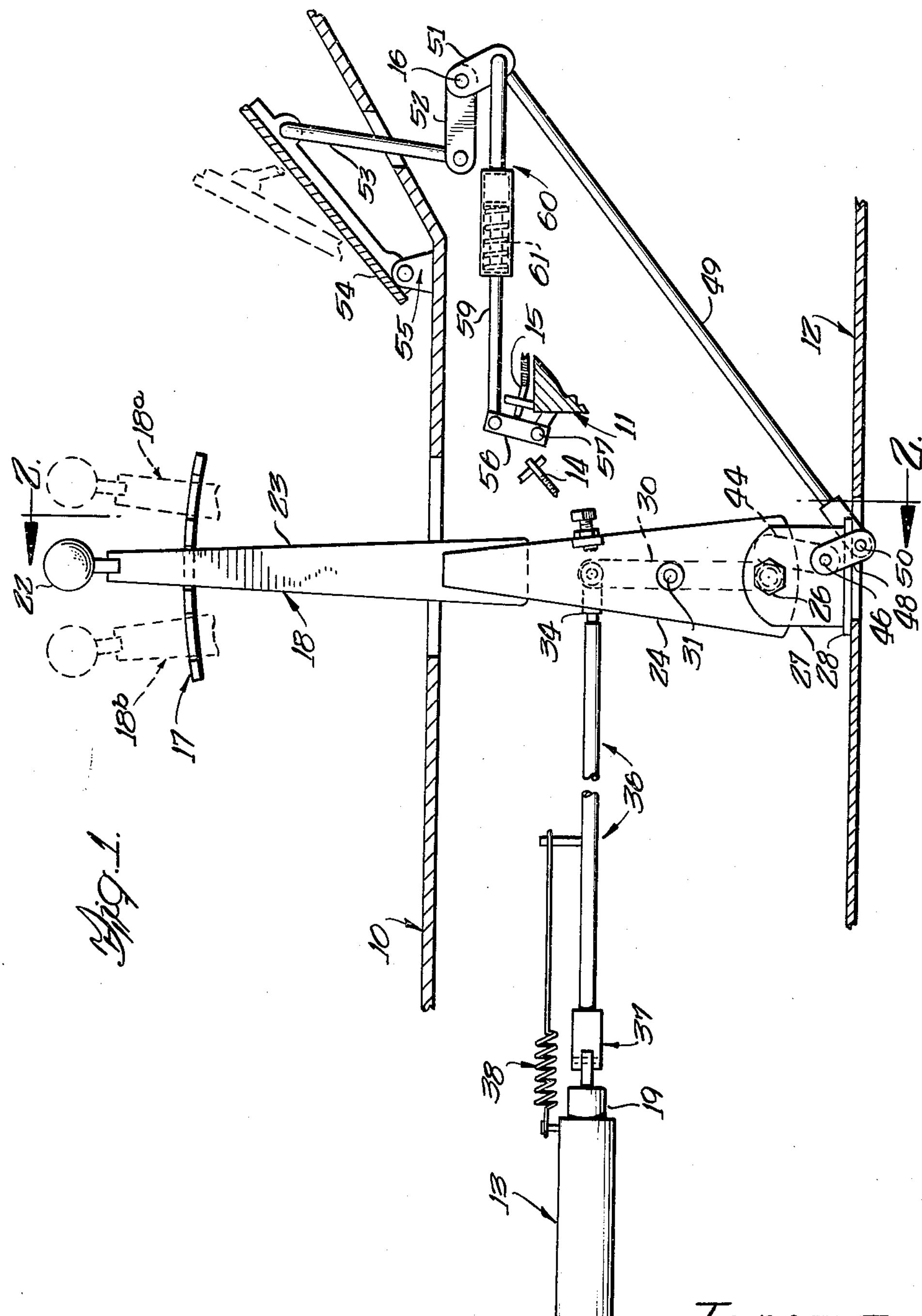
FIGURE 1 is a somewhat diagrammatic view of the present invention in which various portions of the tractor to which it is applied are shown in different sizes and sections in order to clearly explain the construction of the present invention.

The present embodiment is the preferred embodiment, but it is to be understood that changes can be made in the present embodiment by one skilled in the art without departing from the spirit and scope of the present invention.

For a general description of the present invention reference is made to the drawings. The three different speed ranges of the transmission are controlled by a hydraulic control valve having a spool slidable along its longitudinal axis to three different positions, one for each speed range. The control valve is operated by a lever arrangement, the upper portion of which terminates in the operator's compartment of the tractor. The lower end of the lever arrangement is pivotally carried in the tractor, and the spool of the control valve is connected to the lever through a link which is pivotally connected to the upper end of another lever which is carried by the first lever. The spool of the transmission shifting valve is not provided with detents but is freely slidable within the valve bore and is biased to the innermost position by a spring connected between the body of the valve and the link which connects the valve spool to the lever carried by the operator's lever. The upper end of the operating lever is provided with detent means so that the operator may selectively position the lever in any one of three positions corresponding to the three operated positions of the valve. The second lever, or that which is carried by the main or operating lever, is pivotally mounted intermediate its ends on the main lever and the lower end thereof is provided with semi-circular bearing means which abut one side of the pin means for the main lever. Thus the second lever is pivotable about two different axes. The first axis is that of the main lever and pivoting thereabout occurs when the main lever is moved to any one of the three positions, the second lever merely following the movement of the main lever, there being no relative movement between these levers. The second axis is that of the second lever on the main lever and pivoting thereabout occurs when the lower end of the second lever is pivoted in a clockwise direction as viewed in FIGURE 1 by the lever and linkage means connected to the throttle pedal. The throttle pedal lever and linkage means is so formed that operation upon the second lever occurs only after the throttle pedal is operated past the position for full open throttle. If the main lever has been positioned by the operator of the machine to the second speed position and if the throttle pedal is then operated past the full throttle position, the second lever will be pivoted clockwise, as viewed in FIGURE 1, to move the valve spool outwardly of the valve body to cause the transmission to be shifted to the first or lowest speed ratio. If the throttle pedal is then released, the spring on the valve will return the valve to the position for the second speed ratio of the transmission. If the main lever has been positioned in the third or highest speed ratio position by the operator of the machine, and if the throttle pedal is then moved beyond the full throttle position, the second lever will be again moved clockwise, however, this time causing the valve to be operated to shift the transmission to the second speed ratio. Again, if the throttle pedal is released, the spring connected to the valve will operate the valve to cause the transmission to be returned to the third speed ratio. Thus if the transmission of the vehicle is either in the third or second speed range, the operator may cause a downshifting of the transmission one speed ratio merely by pressing the throttle pedal past the point of full open throttle.

Turning to a detailed description of the present invention, continued reference is made to the drawings. For purposes of brevity, a complete vehicle is not shown, but it is to be understood that the present embodiment of the invention is applied to a motor vehicle having an operator's compartment for operation of the vehicle, frame members, and an engine or power source which is controlled by a foot throttle pedal. The transmission 70 is operatively connected between the engine and the traction means with the transmission being of the hydraulically controlled type. The members 10, 11 and 12 indicate various standard parts of a motor vehicle, member 10 being the floor of the operator's compartment, member 11 being either a frame member or the carburetor housing of the engine, and member 12 being another frame member. Although not shown, a number of the other parts of the present invention are also fixed relative to the body or frame of the motor vehicle. For example, the hydraulic transmission control valve 13 is constructed so that the valve body is fixed relative to the vehicle. Further, the idle stop adjustment 14 and the full throttle adjustment 15 are also fixed relative to the vehicle, and the pin means 16 is also disposed in a fixed position relative to the motor vehicle. Lastly, the detent quadrant 17 for the main lever 18 is secured in the operator's compartment in a particular position providing for indexing of the valve 13 in its three operated positions.

The hydraulic valve 13 comprises a valve spool 19 slidably carried therein and freely movable to any one of three distinct positions. Hydraulic fluid under pressure is delivered to the valve 13 by conduit 76 connected to the hydraulic fluid pump 77. Low pressure or return hydraulic fluid is delivered to the reservoir 78 by conduit 79 connected to the valve 13. The valve 13 includes suitable internal passageways and a spool construction so that when the valve spool 19 is in its outermost position relative to the valve body, hydraulic fluid under pressure is delivered to conduit 73 and conduits 71 and 72 are vented to the reservoir conduit 79. The valve 13 is further formed so that when the valve spool 19 is moved inwardly from its outermost position a certain amount, hydraulic fluid under pressure is delivered to conduit 72 and conduits 71 and 73 are vented to the reservoir conduit 79, and when valve spool 19 is moved to its innermost position relative to the valve body, the hydraulic fluid under pressure is delivered to conduit 71 while conduits 72 and 73 are vented to the reservoir conduit 79. The flow of hydraulic fluid to and from the conduits 74 and 75 need not be herein described since these conduits supply fluid to the transmission 70 for selection of a direction of rotation of the output shaft of the transmission to produce either the forward or reverse direction of the vehicle. The valve 13 further is mechanically and hydraulically balanced so that without any external biasing means, the spool 19 is freely movable between all three positions.

The transmission 70 comprises an input shaft 80 connected to the flywheel 69 of the engine. The input shaft 80 has a pair of sun gears 81 and 82 splined thereon. The sun gear 82 is part of a planetary set for the first speed ratio, and that planetary set further comprises a planet gear carrier 83 and a ring gear 84. The planet carrier 83 carries a plurality of planet pinion gears, such as planet pinion gear 85, which mesh with the sun gear 82 and the ring gear 84. A hydraulically operated brake 86 is provided for the carrier 83, and the brake 86 is connected to hydraulic fluid conduit 73 so that hydraulic fluid pressure delivered thereto will cause operation of the brake 86 to hold the carrier 83 against rotation. The ring gear 84 is common to the ring gear for a second planetary set which includes the sun gear 81 so that rotation of the ring gear 84 for the first speed planetary set will cause rotation of the ring gear for the second speed planetary set. The second speed planetary set further comprises a planet pinion gear carrier 87 which rotatively carries a plurality of planet pinion gears such as planet pinion gear 88. Ring gear 84 is provided with a hydraulically operated brake 89 which is connected to conduit 72 so that when hydraulic fluid under pressure is delivered thereto, the brake is operated to hold the ring gear 84 against rotation. The third speed ratio is produced by a hydraulic clutch 90 which is interposed between the shaft 80 and the carrier 83 of the planetary set for the first speed ratio. The clutch 90 is connected to conduit 71 so that when hydraulic fluid under pressure is delivered thereto, the carrier 83 and the sun gear 82 of the planetary set for the first speed ratio are locked against relative rotation so that the ring gear 84 will be driven by the shaft 80. Two further planetary sets are provided for producing the forward and reverse directions. The planetary set for the forward direction comprises a sun gear 91, a planet pinion gear carrier 92, a plurality of planet pinion gears such as planet pinion gear 93, a ring gear 94 and a hydraulically operated brake 95. The sun gear 91 is keyed to a sleeve 96 which in turn is keyed to the planet carrier 87 for the second speed ratio. The planet carrier 92 is keyed to a gear 97 which in turn meshes with a gear 98 which in turn drives the output shaft 99 of the transmission. The brake 95 is operatively connected to the ring gear 94 so that when hydraulic fluid under pressure is delivered to conduit 74, the brake is operated to hold the ring gear 94 against rotation. The planetary set for the reverse direction comprises a sun gear 100, a planet pinion gear carrier 101, a plurality of planet pinion gears such as planet pinion gear 102, a ring gear 103 and a hydraulic brake 104. The sun gear 100, as sun gear 91, is keyed to the planet carrier 87 for the second speed ratio. The planet carrier 101 is provided with the hydraulic brake 104 so that when hydraulic fluid under pressure is delivered to conduit 75, the brake 104 is operated to hold the planet carrier 101 against rotation. The ring gear 103 is keyed to the planet carrier 92 of the forward direction planetary set which previously was described as keyed to the gear 97. Assuming that the brake 95 for the forward direction and the brake 86 for the first speed ratio are operated and the other brakes are deenergized, it may be seen that the shaft 80 will drive sun gear 82 which in turn will rotate the planet pinion gears 85 about their own axes to drive the ring gear 84. The ring gear 84 will in turn rotate the planet pinion gears 88 of the second speed ratio, which planet pinion gears are also driven by sun gear 81 keyed to shaft 80. The resultant thereof will be a rotation of the planet carrier 87 which will in turn rotate sun gear 91 of the forward direction planetary set and since the ring gear 94 is held against rotation, the planet pinion gears 93 will be caused to planetate to in turn rotate the planet carrier 92 and the carrier 92 will in turn rotate gear 97. Gear 97 will rotate the output shaft 99 through the gear 98 in the first speed ratio and the forward direction. Assuming next that the brake 86 is in a deenergized position and that brake 89 is energized, the ring gear 84 is thus held against rotation, and rotation of the sun gear 81 will cause the planet pinion gears 88 to planetate and in turn cause rotation of the carrier 87. Rotation of the carrier 87, will, as previously described, cause rotation of the output shaft 99 of the transmission in the forward direction. The speed of the output shaft 99 will then be that for the second speed ratio. Lastly, assuming that brakes 86 and 89 are in the deenergized condition and that clutch 90 is operated, the ring gear 84 and the sun gear 81 will be driven by the shaft 80. This will, in turn, cause a rotation and planetation of the planet pinion gears 88 which in turn will rotate the carrier 87 to cause the output shaft 99 to be rotated in the third speed ratio and in the forward direction. It is not believed necessary to describe the operation of the transmission in the reverse direction, that operation being easily seen from the drawing. Thus it may be seen that when the valve spool 19 is in its outermost position relative to the valve body, the transmission is operated in the lowest or first speed ratio; when the valve spool 19 is moved inwardly from its outermost position a certain amount, the transmission is operated to the second or medium speed ratio; and when the valve spool 19 is moved to its innermost position relative to the valve body, the transmission is operated to the third or high speed ratio.

The main lever 18 comprises a handle portion 22, a spring member 23 and a pair of bifurcated arms 24. The ends of the bifurcated arms 24 are provided with bearings 25 permitting free pivotal movement of the main lever 18 about the axis of the pins 26. The pair of pins 26 are each secured in the upstanding flanges 27 to extend toward each other along the same axis. The adjacent ends of the pins 26 project inwardly of the arms 24 of the lever 18 but do not meet. The upstanding flanges 27 are secured in a spaced apart relationship to each other on a base member 28 which in turn is secured to the frame member 12 of the vehicle. Thus it may be seen that by movement of the handle 22 of the lever 18, the lever 18 is pivotally movable about the axis of the pins 26. The spring member 23 is provided to permit biasing of the lever 18 in the notches of the indexing quadrant 17. The indexing quadrant 17 is provided with three notches, one for each of the three selective speed ratios of the transmission. The quadrant 17 is secured within the operator's compartment of the motor vehicle and is particularly positioned so as to provide for indexing of the valve 13 in any one of its three operated positions.

The lever 18 is not directly connected to the valve 13 but is indirectly connected thereto through a second lever 30.

The lever 30 is considerably shorter than the lever 18 and is pivotally carried intermediate its ends between the arms 24 of the lever 18 by a pin 31. The pin 31 is carried in suitable openings or holes in the arms 24 and is provided with spacers 32, each spacer being disposed on one side of the lever 30 between the arms 24 of the lever 18 to substantially position the lever 30 midway between the arms 24. The upper end of the lever 30 is pivotally secured to a clevis member 34 by a pin 35 extending through the clevis 34 and the end of the lever 30. The clevis 34 is connected to one end of a link 36 and the other end of the link 36 is connected to a clevis 37. The clevis 37 in turn is pinned to the valve spool 19 of the valve 13. A coiled biasing spring 38 is also provided, and this spring 38 is connected between the valve body of the valve 13 and the link 36 in such a manner that the spring 38 biases the valve spool 19 to its innermost position relative to the valve body of the valve 13. The lever 18 and its pivotal axis must be so aligned relative to the indexing quadrant 17 and the valve 13 so that when the lever 30 is moved with the lever 18, a movement of the lever 18 to the dotted line position **18*a* in FIGURE 1 results in an operation of the valve 13 to the first or lowest speed ratio, movement of the lever 18 to the solid line position shown in FIGURE 1 results in an operation of the valve 13 to that for the second or medium speed ratio, and movement of the lever 18 to the dotted line position 18*b* shown in FIGURE 1 results in an operation of the valve 13 to the position for the third or highest speed ratio of the transmission of the motor vehicle. The lower end of the lever 30 has a thickness sufficiently small to permit movement of the lower end of the lever 30 between the inner ends of the pins 26. The lower end of the lever 30 is provided with a pair of semicircular bearings 41. Each of the bearings 41 has an inner curvature conforming to the curvature of the inner end of the pin 26, and each is fixedly carried on one side of the lever 30 in cooperation with the inner ends of the pins 26. The bearings 41 are positioned on the lever 30 on the side of a vertical line through the center of pins 26 that valve 13 and link 36 is positioned. This construction and relative positioning of the various members provides that the coiled spring 38 tends to move the lever 30 to project the bearings 41 against the pins 26 through the force on the link 36 tending to move the lever 30 in a counterclockwise direction as viewed in FIGURE 1. Thus it may be seen that with the pins 26 acting as stops for the lever 30, movement of the lever 18 from the third speed ratio position to the second speed ratio position or from the second speed ratio position to the first speed ratio position causes a corresponding operation of the valve 13 to those positions through the link 36, the clevis 34, the upper half of the lever 30, and pin 31 to lever 18. This movement of the valve occurs against the biasing force of spring 38, and movement of the lever 18 in the opposite direction or to positions of higher speed ratios permits movement of the valve 13 to the corresponding positions through the force applied by the coiled spring 36. It should be noted that the movement of the lever 30 caused by movements of the lever 18 produces pivoting of the lever 30 about the axis of pins 26**.

Figures 2, 3, 4:
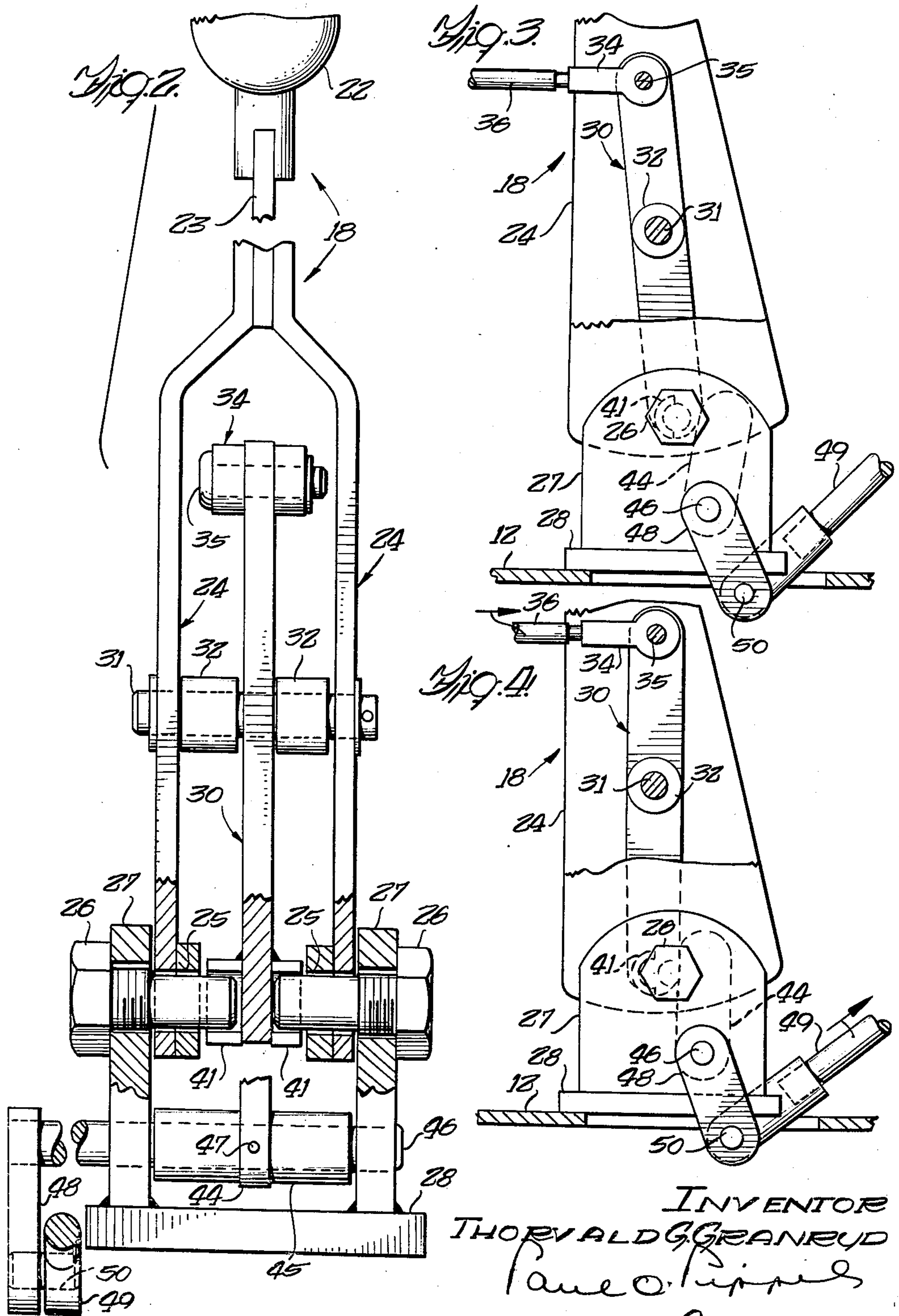
FIGURE 2 is an enlarged end view of a portion of the structure shown in FIGURE 1 and taken substantially along the line 2—2 of FIGURE 1.
FIGURE 3 is an enlarged partial view of the structure shown in FIGURE 1 with the transmission range lever operated to the third or high speed range.
FIGURE 4 is a view such as shown in FIGURE 3 but with the throttle pedal linkage operated to show the downshift of the transmission to the second speed range.
Figure 5:
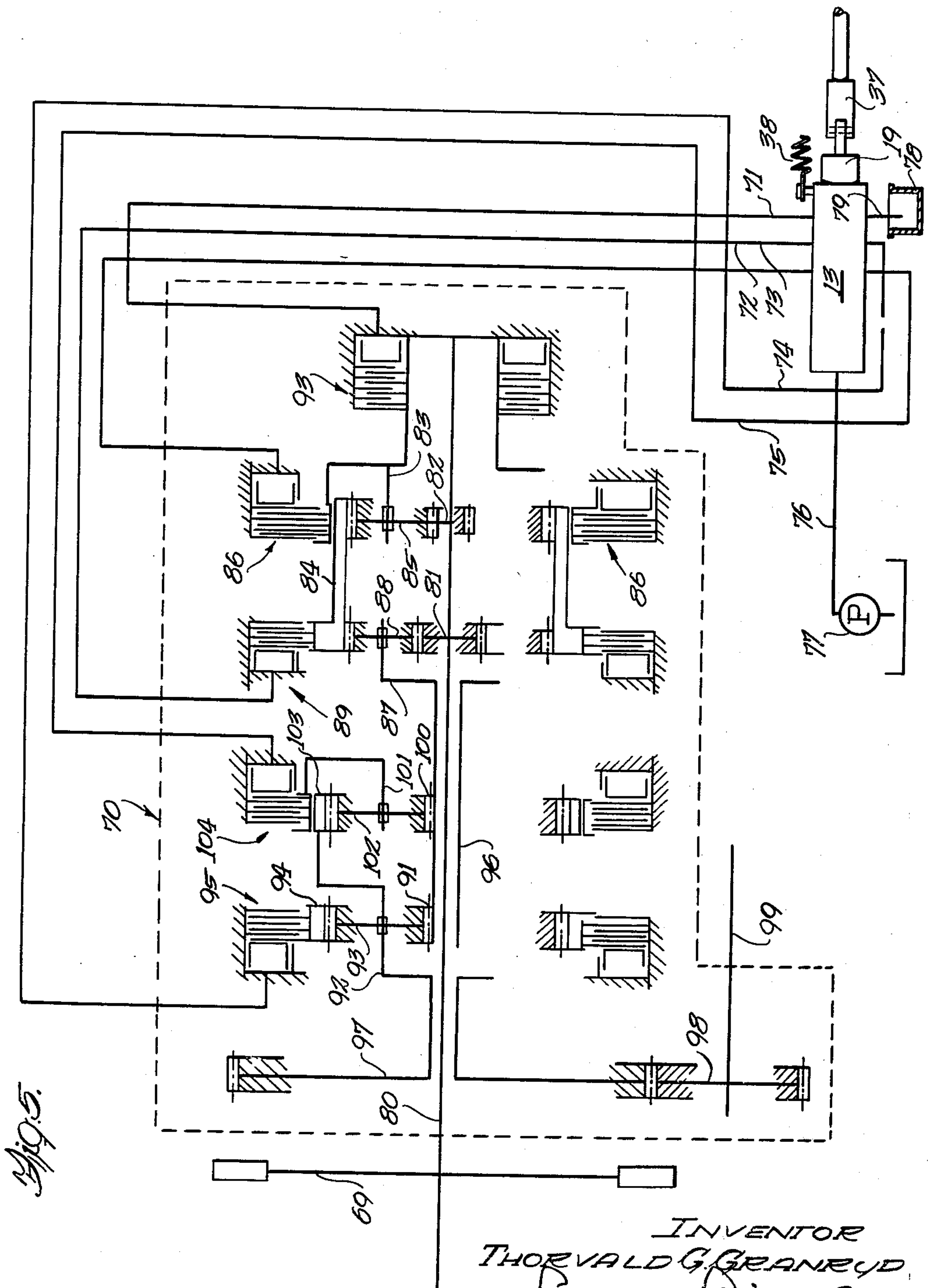
FIGURE 5 is a diagrammatic view of a transmission to which the present invention is applied.

Turning next to a description of the throttle pedal lever and linkage arrangement for pivoting the lever 30 relative to the lever 18, the position of the lower end of lever 30 between the inner ends of the pins 26 permits movement of a lever 44 between pins 26 and against the lower end of lever 30. Lever 44 is secured to a cylindrical member 45 which in turn is keyed to shaft 46 by pin 47 which may easily be seen in FIGURE 2. Shaft 46 is journalled through the upstanding flanges 27 and one extending end of shaft 46 is provided with lever 48 secured thereto. The other end of lever 48 is pivotally connected to one end of a link 49 by a pin 50. Thus it may be seen that the levers 44 and 48 form a bell crank such that when the link 49 is moved to rotate the lever 48 in a counterclockwise direction as viewed in FIGURE 1, the lever 44 is also moved counterclockwise between the ends of the pins 26 and against the lower end of the lever 30. Movement of the lever 44 against lever 30 will cause the lever 30 to be moved in a clockwise direction as viewed in FIGURE 1 about pin 31, the bearings 41 moving away from the pins 26 and the link 36 being moved to cause an operation of the valve 13 to in turn cause a downshifting of the transmission one speed ratio step. If the lever 18 is in the detent slot in quadrant 17 for the third speed ratio, the pivoting of lever 30 about pin 31 will cause an operation of the valve 13 to the position for the second speed ratio, and if the lever 18 is in the detent in the quadrant 17 for the second speed ratio, such as shown in FIGURE 1, movement of the lever 30 about pin 31 will cause an operation of valve 13 to the operated position for the first speed ratio. The movement of the lever 30 relative to lever 18 to provide the downshift from the third speed ratio to the second speed ratio is shown in FIGURES 3 and 4.

The upper end of the link 49 is pivotally connected to lever arm 51. Lever arm 51 is connected as a bell crank to lever arm 52 with pin means 16 pivotally carrying arms 51 and 52 in the motor vehicle. Arm 52 is pivotally connected to one end of a link 53 and the other end of the link 53 is pivotally connected to the throttle pedal 54. The throttle pedal is pivotally carried in the operator's compartment by a flange and pin arrangement 55. The lever 56 is secured to the throttle operating pin 57. The lever 56 is connected to the lever arm 51 through a motion limiting arrangement comprising a plunger 59, a spring housing and link 60 and a coiled spring 61. The plunger 59 is pivotally connected at one end to one end of the lever 56. The other end of the plunger 59 is disposed within the spring housing 60 and coiled spring 61 is positioned between the head of the plunger 59 and the end of the spring housing arrangement 60 so that the effective length of the link between levers 51 and 56 may be increased by a compression of coiled spring 61. The adjustable stops 14 and 15 respectively provide for the minimum idle throttle limit and the full throttle position. As can be seen in FIGURE 1 in the solid lines, the throttle pedal 54 is shown substantially at the point of full throttle. A further depression of the throttle pedal 54 toward the floor of the operator's compartment will result in a compression of coil spring 61 since the throttle setting is that for maximum full throttle, and a movement of the link 49 to move the lever 44 against the lower end of lever 30. If the throttle pedal 54 is completely released it will return substantially to the dotted line position shown in FIGURE 1, that for the idle position of the carburetor or other fuel metering means of the engine.

In conclusion, it may be seen from the foregoing that the present invention comprises a certain arrangement for a motor vehicle wherein the operator may position the lever 18 in any one of three different transmission speed ratios and if the selected speed ratio is either the second or third speed ratio, the operator of the vehicle may when necessary produce a downshifting of the transmission one speed ratio from the selected speed ratio merely by fully depressing the throttle pedal of the vehicle.

Having described the invention, what is considered new and desired to be protected by Letters Patent is:

1. In a motor vehicle having a throttle pedal and having a multi-speed ratio transmission having fluid motors operable to operate said transmission to different speed ratios, a hydraulic valve connectable to said fluid motors and operable to a plurality of positions for controlling the operation of said transmission to any one of a plurality of different speed ratios, a manually operable lever pivotally carried in said vehicle, means connecting said lever to said hydraulic valve so that said lever is manually pivotable to a plurality of different positions to selectively operate said hydraulic valve to said plurality of different positions, and means connectable to the throttle pedal of said motor vehicle and connected to said lever and operating responsive to the operation of said throttle pedal beyond the point for maximum full throttle to operate said hydraulic valve from at least two different selected speed ratio positions to one lower speed ratio position than the selected speed ratio position of said lever.

2. In a motor vehicle having a throttle pedal and having a multi-speed ratio transmission having fluid motors operable to operate said transmission to different speed ratios, means connectable to said fluid motors and operable to a plurality of positions for controlling the operation of said transmission to any one of a plurality of different speed ratios, a manually operable lever pivotally carried in said vehicle, linkage means operatively carried by said lever and connected to said first means so that said lever is manually pivotable to a plurality of different positions to selectively operate said first means to selectively operate said fluid motors to control the operation of said transmission to any one of said plurality of different speed ratios, and second linkage means connectable to the throttle pedal of said motor vehicle and positioned in cooperation with said first linkage means and operating responsive to the operation of said throttle pedal beyond the point of maximum full throttle to operate said first linkage means to operate said first means to operate said fluid motors to control the operation of said transmission from at least two different selected speed ratio positions to one lower speed ratio position than the selected speed ratio position of said lever.

3. In a motor vehicle having a throttle pedal and having a multi-speed ratio transmission having fluid motors operable to operate said transmission to different speed ratios, a hydraulic valve connectable to said fluid motors and operable to a plurality of positions for controlling the operation of said transmission to any one of a plurality of different speed ratios, a manually operable lever pivotally carried in said vehicle, linkage means carried by said lever and connected to said hydraulic valve so that said lever is manually pivotable to a plurality of different positions to selectively operate said hydraulic valve to said plurality of different positions, and second linkage means connectable to the throttle pedal of said motor vehicle and cooperating with said first linkage means carried by said lever, said second linkage means operating responsive to the operation of said throttle pedal beyond the point for maximum full throttle to operate said hydraulic valve from at least two different selected speed ratio positions to one lower speed ratio position than the selected speed ratio position of said lever.

4. In a motor vehicle having a throttle pedal and having a multi-speed ratio transmission having fluid motors operable to operate said transmission to different speed ratios, means connectable to said fluid motors and operable to a plurality of positions for controlling the operation of said transmission to any one of a plurality of different speed ratios, a manually operable lever, means pivotally mounting the lower end of said lever in said vehicle, linkage means pivotally carried on said lever intermediate the ends thereof and connected to said first means so that said lever is manually pivotable to a plurality of different positions to selectively operate said first means to said plurality of different positions, and second linkage means connectable at one end thereof to the throttle pedal of said motor vehicle and pivotally connected at the other end thereof in said vehicle in cooperation with said first linkage means, said first and second linkage means being formed relative to said lever so that said first linkage means is operated by said second linkage means responsive to the operation of said throttle pedal beyond the point for maximum full throttle to operate said first means from at least two different selected speed ratio positions to one lower speed ratio position than the selected speed ratio position of said lever.

5. In a motor vehicle as defined in claim 4, wherein said first means comprises a hydraulic valve having a freely shiftable valve spool slidable to a plurality of different positions to operate said fluid motors to control the operation of said transmission to any one of said plurality of different speed ratios, and a quadrant fixedly carried in said vehicle and having a plurality of notches formed to engage said lever, said notches being relatively positioned on said quadrant at positions corresponding to said plurality of operable positions of said valve.

6. In a motor vehicle having a throttle pedal and having a multi-speed ratio transmission having fluid motors operable to operate said transmission to different speed ratios, a hydraulic valve for controlling the operation of said transmission to any one of a plurality of different speed ratios, said hydraulic valve comprising a valve spool slidable therein to a plurality of different positions providing for operation of said transmissions to any one of said plurality of different speed ratios, a manually operable lever pivotally carried at the lower end thereof in said vehicle, a second lever pivotally carried intermediate the ends thereof on said first lever intermediate the ends thereof, a link pivotally connecting the upper end of said second lever to said valve spool, means releasably maintaining said second lever to follow the movement of said first lever so that said first lever is manually pivotable to a plurality of different positions to selectively slide said valve spool to said plurality of different positions, and linkage means connectable at one end thereof to the throttle pedal of said motor vehicle and pivotally connected at the other end thereof in said vehicle in cooperation with the lower end of said second lever, said linkage means operating responsive to the operation of said throttle pedal beyond the point for maximum full throttle to pivot said second lever relative to said first lever to slide said valve spool from at least two different speed ratio positions to one lower speed ratio position than the selected speed ratio position of said first lever.

7. In a motor vehicle as claimed in claim 6 wherein said means releasably maintaining said second lever to follow the movement of said first lever comprises semi-circular bearing members formed on the lower end of said second lever and engaging pin means pivotally mounting said first lever in said vehicle, and a tensioned coiled spring connected between said valve and said link connecting the upper end of said second lever to said valve spool to bias said semi-circular bearing means of said second lever against said pin means pivotally mounting said first lever in said vehicle.

8. In a motor vehicle as claimed in claim 7, wherein said linkage means operates to pivot said second lever against the tension of said coiled spring.

References Cited in the file of this patent

UNITED STATES PATENTS

Re. 24,122 Randol ---------------- Feb. 21, 1956